(12) United States Patent
Welfonder

(10) Patent No.: US 6,463,990 B1
(45) Date of Patent: Oct. 15, 2002

(54) METHOD FOR MOUNTING A FABRIC

(75) Inventor: Konrad Welfonder, Bremerhaven (DE)

(73) Assignee: Hunter Douglas Industries B.V., Rotterdam (NL)

( * ) Notice: Subject to any disclaimer, the term of this patent is extended or adjusted under 35 U.S.C. 154(b) by 0 days.

(21) Appl. No.: 09/743,566

(22) PCT Filed: Jul. 23, 1999

(86) PCT No.: PCT/EP99/05288
§ 371 (c)(1),
(2), (4) Date: Mar. 14, 2001

(87) PCT Pub. No.: WO00/05479
PCT Pub. Date: Feb. 3, 2000

(30) Foreign Application Priority Data

Jul. 24, 1998 (EP) ............................................. 98202486

(51) Int. Cl.⁷ ................................................ A47G 5/02
(52) U.S. Cl. ...................................... 160/238; 160/395
(58) Field of Search ................................ 160/391, 383, 160/392, 395, 405, 371, 369, 66, 67, 23.1, 22, 238

(56) References Cited

U.S. PATENT DOCUMENTS 3,214,314 A * 10/1965 Rowbottam ............. 160/383 X
3,455,367 A    7/1969 Le Tarte ...................... 160/371
4,186,660 A *  2/1980 Key ........................... 101/128.1
4,258,778 A *  3/1981 Upton et al. ................. 160/383
5,027,743 A    7/1991 Ludwig ....................... 118/300
5,049,424 A *  9/1991 Carden et al. ........ 160/178.1 X
5,097,886 A    3/1992 Moyet-Ortiz ............ 160/368.1
5,351,736 A * 10/1994 Laffler et al. .................. 160/66
5,540,476 A    7/1996 Cowsert ...................... 296/107
5,722,278 A    3/1998 Horino et al. ................. 72/8.3
6,279,644 B1 * 8/2001 Wylie ......................... 160/371

FOREIGN PATENT DOCUMENTS

DE        26 17 279         11/1977

* cited by examiner

Primary Examiner—David M. Purol
(74) Attorney, Agent, or Firm—Dorsey & Whitney LLP

(57) ABSTRACT

A method of forming a strip-like mounting element (14a) in situ on a side of a flexible, preferably fabric, sheet (16) comprising the steps of proving a thermoplastic, preferably a hot-melt adhesive (14), in a heated state in a longitudinally-extending undercut groove (12) of a longitudinally-elongate receiving member (10), and pressing the side of the sheet (16) against the thermoplastic in a longitudinally-extending opening (13) in the groove (12). Whereby one side of the thermoplastic adheres to the sheet and an opposite side of the thermoplastic is removably positioned in the groove of the receiving member.

45 Claims, 3 Drawing Sheets

1

METHOD FOR MOUNTING A FABRIC

CROSS REFERENCE TO RELATED APPLICATIONS

This application is a national filing off the Patent Cooperation Treaty ("PCT") Application No. PCT/EP99/05288, filed Jul. 23, 1999, having a publication number of WO 00/05479, published on Feb. 3, 2000, which PCT application claims priority to European Patent Application No. 98202486.1, filed July 24, 1998. Each of the above-identified applications are hereby incorporated by reference as though fully disclosed herein.

BACKGROUND OF THE INVENTION

The invention relates to a method for mounting a flexible sheet, such as a fabric, on a receiving member, such as a shaft of a roller blind or a bottom bar thereof, so as to allow for easy disconnection and reconnection of the sheet to the receiving member.

SUMMARY OF THE INVENTION

A method for mounting flexible sheets or panels on a receiving member is described in EP 0 481 260 (A2). A strip-like element is used which has a first elongate portion connected to a flexible sheet and a second elongate portion received in a longitudinally-extending undercut groove of the receiving member. The second elongate portion includes an array of pivotably and resiliently flexible, parallel disc-shaped elements which are arranged transversely of the length of the strip-like element. The contours of the disc-shaped elements correspond to the cross-sectional shape of the undercut groove.

In order to mount a panel in accordance with EP 0 481 260 (A2), it is necessary to bend the disc-shaped members to one side so that they can then be slid into the undercut groove of the receiving member. Once mounted, the resilient disc-shaped members move back to their original position and lock the panel in the groove. It is, however, not easy to mount the disc-shaped elements initially in a groove of a receiving member or to disconnect thereafter the disc-shaped elements from the groove. This is due, at least in part, to the large number of disc-shaped elements.

In order to provide an easier method of connecting, disconnecting and then reconnecting a flexible sheet to a longitudinally-elongate receiving member, such as a roller blind shaft, for example in order clean or replace the sheet, this invention provides a method for forming a strip-like mounting element in situ on a side of the sheet comprising the steps of: providing a thermoplastic, preferably a hot-melt adhesive, in a heated state in a longitudinally-extending undercut groove of an elongate receiving member; and pressing the side of the sheet against the thermoplastic in a longitudinally-extending opening in the groove; whereby one side of the thermoplastic adheres to the sheet and an opposite side of the thermoplastic is removably positioned in the groove of the receiving member.

The strip-like mounting element can be formed during the production and assembly of a roller blind by having its shaft or bottom bar serve as the receiving member. The sheet can also be provided with the strip-like mounting element, without the roller blind shaft or bottom bar, preferably by forming the strip-like mounting element, using a mandrel having a longitudinally-extending under-cut groove, similar to the under-cut groove of the roller blind shaft or bottom bar,

BRIEF DESCRIPTION OF THE DRAWINGS

Further aspects of the invention will be apparent from the detailed description below of particular embodiments and the drawings thereof, in which.

DETAILED DESCRIPTION

Figure 1:
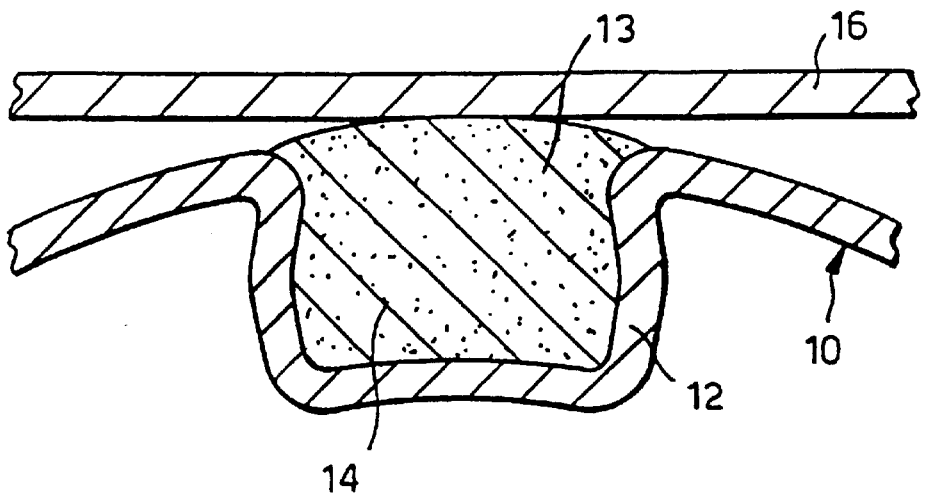
FIG. 1 is an enlarged schematic detail end view, partly in cross section, of a first step of the method of this invention; a fabric is placed adjacent to a thermoplastic in an undercut groove of a shaft of a roller blind, just prior to the fabric's being adhered to the thermoplastic.

FIG. 1 shows schematically the first step of the method of the invention. A longitudinally-elongate shaft 10 of a roller blind is provided with an upwardly-open longitudinally-extending elongate undercut groove 12 having a longitudinally-extending opening 13 and containing a hot-melt adhesive 14. The groove 12 and its opening 13, as well as the adhesive 14 therein, preferably extend along the entire longitudinal length of the shaft 10. A flexible fabric sheet 16 is provided atop the adhesive 14 and the opening 13 of the groove 12.

Figure 2:
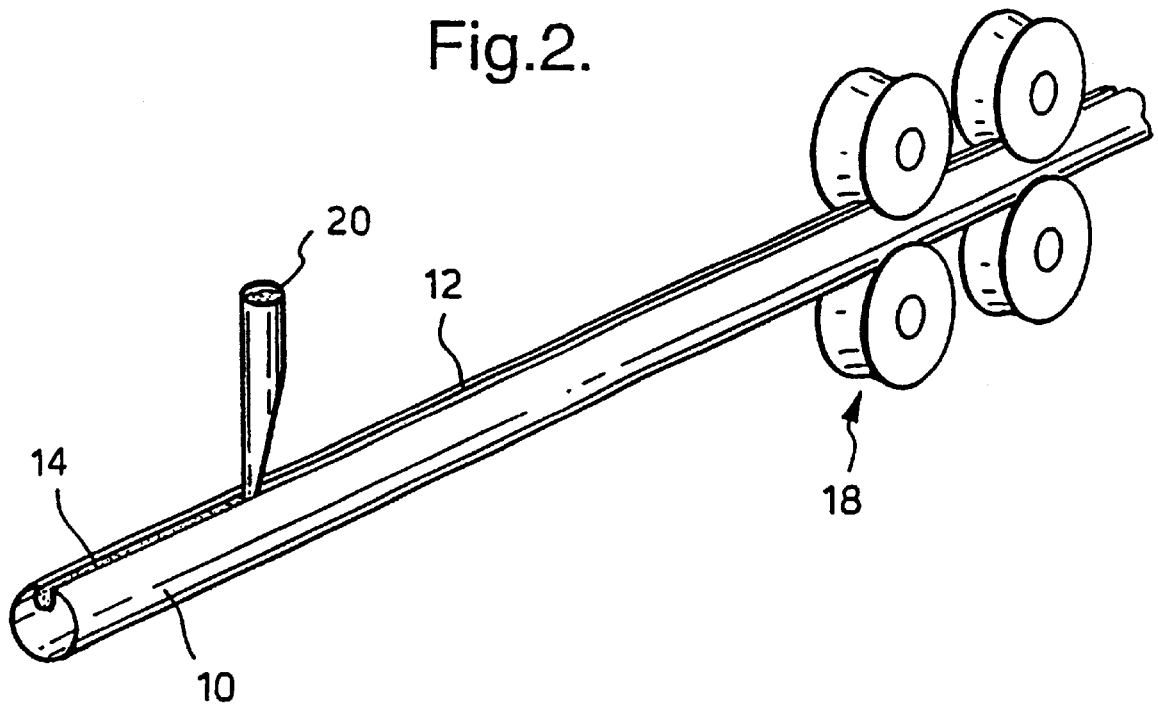
FIG. 2 is a schematic view of a preliminary step in the method of the invention; one way is shown for providing the thermoplastic in the undercut groove of the shaft of the roller blind, prior to the step of FIG. 1.

FIG. 2 shows schematically one way of providing the hot-melt adhesive 14 in a fluid form in the undercut groove 12 of the shaft 10 during, or directly after, the final steps of roll-forming the shaft with its groove. Alternatively, the adhesive 14 can be provided in the groove 12 after the shaft 10 has been cut to the desired length. Preferably, the adhesive 14 is provided in the groove 12 during the roll-forming or extrusion of the shaft 10. Preferably, the adhesive 14 is poured in liquid form, i.e., molten state, in the opening 13 in the top of the groove 12, but alternatively, it could be provided in a solid form in the groove as described below. The hot-melt adhesive, while being applied to the groove as shown in FIG. 2, conforms to any variation in shape or dimension of the groove and thereby ensures its exact form-fit within the groove. An unbreakable connection of the adhesive with the surface of the groove can be prevented by using an appropriate non-stick surface for the groove.

Upon solidification of the hot-melt adhesive 14 within the groove 12 following the step shown in FIG. 2, the adhesive becomes a longitudinally-extending, strip-like or ribbon-like, mounting element 14A which can subsequently be remelted so that it will adhere to one side of the fabric sheet 16 as described below. Due to shrinkage of the adhesive 14 upon solidification, there is already an inherent tendency in the strip-like mounting element 14A to release itself from the inner surfaces of the groove 12.

Figure 6:
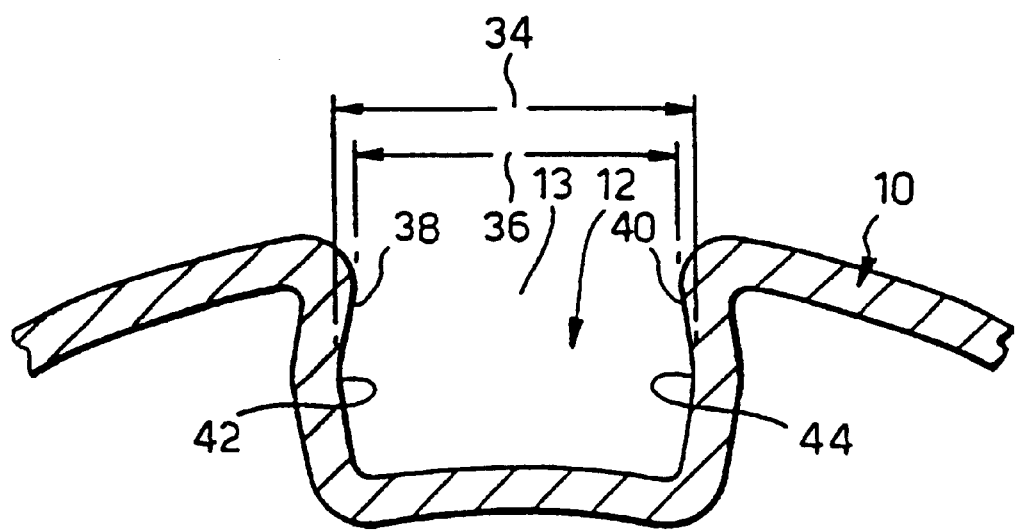
FIG. 6 is an enlarged schematic detail end view of the undercut groove in the shaft of FIGS. 1–5.

Because of the cross-sectional shape of the under-cut groove 12 of the shaft 10, as shown in FIGS. 1 and 6, the strip-like mounting element 14A assumes substantially the same cross-sectional shape as the groove. In this regard, the form and dimensions of the groove 12 are selected to ensure a form-fit between the mounting element 14A and the groove 12. This form-fit allows the groove 12 to hold the mounting element 14A radially of the shaft 10 but also allows the mounting element to be removed by lifting one of its ends radially away from the shaft and away from the groove and longitudinally of the shaft and groove. In this regard, the groove 12 is preferably shaped, as discussed below with regard to FIG. 6, to form a "snap-fit" connection with the mounting element 14A.

In the preliminary step of FIG. 2, the hot-melt adhesive 14 can be applied to the opening 13 in the groove 12 in a predetermined amount such that the adhesive projects slightly beyond (i.e., above) the outer circumference of the roller as shown in FIG. 1. This allows the adhesive to be subsequently reheated and adhered to the fabric sheet 16 with a flat heating sole 22 shown in FIG. 3. The predetermined amount of adhesive 14 can, however, also be less so that the adhesive is only in the groove 12, within the circumference of the roller. In that case, a profiled heating anvil 22 would be required to reheat the adhesive and adhere it to the fabric sheet 16.

In FIG. 2, the roll-forming equipment for making the shaft 10 and its undercut groove 12 has been shown schematically as a pair of opposed rollers 18. This is because such equipment is conventional as seen from U.S. Pat. No. 1,355,282 and French patent publication 1 539 11 3. A nozzle 20 is positioned at the exit end of the roll-forming device 18, and its delivery speed of melted hot-melt adhesive 14 to the groove 12 is preferably adapted to the operating speed of the roll-former, so that the adhesive is applied to the groove 12 almost immediately after the shaft 10 has been roll-formed. Alternatively, the adhesive 14 could be applied later or it could be applied as a solid strip or ribbon to the opening 13 in the groove 12. In the latter case, a suitable spool (not shown) could be positioned in registration with the shaft 10 exiting from the roll-former 18.

Figure 3:
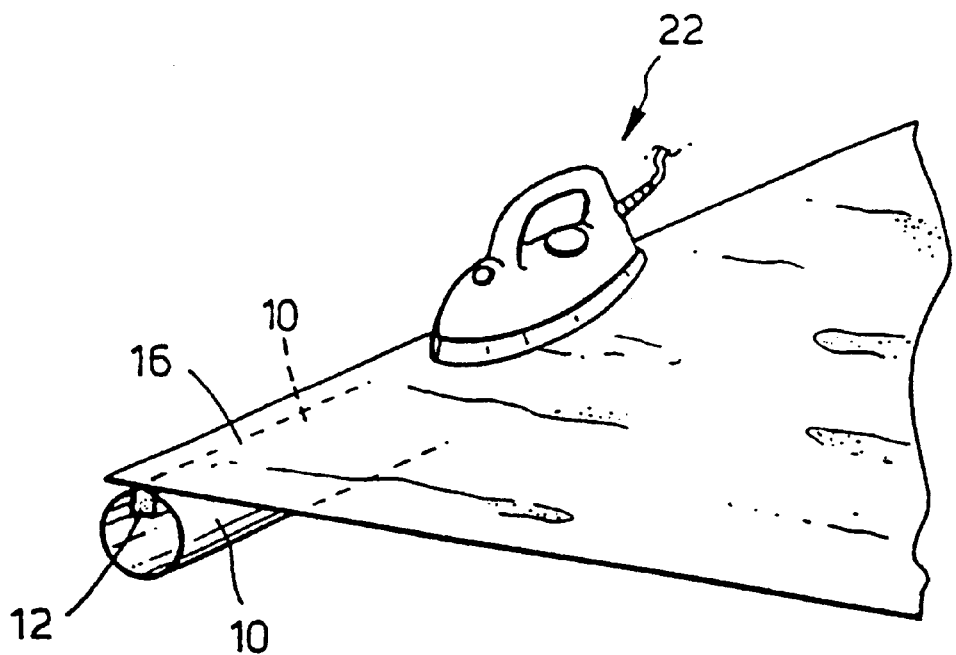
FIG. 3 is a schematic view of the second step of the method of this invention; the thermoplastic in the undercut groove of the shaft is melted by heating the fabric adjacent to the thermoplastic t adhere the thermoplastic to the fabric.

FIG. 3 shows the second step of the method of this invention for adhering the fabric 16 to the strip-like mounting element 14A of the solidified hot-melt adhesive 4 provided in the undercut groove 12 of the shaft 10 as shown in FIG. 2. After the fabric sheet 16 is placed on top of the opening in the groove 12 and on top of the hot-melt adhesive mounting element 14A in the groove 12, preferably with one edge of the fabric sheet 16 parallel and adjacent to the mounting element 14A as shown in FIG. 1, the bottom side of the fabric sheet 16 is adhered to the elongated mounting element 14A, using the flat heating sole 22. In this regard, the flat heating sole 22 heats the fabric sheet 16 which, in turn, heats and thereby remelts the adjacent Underlying portions of the hot-melt adhesive 14. The heating sole 22 also presses against the top side of the fabric sheet, thereby pressing the bottom side of the fabric sheet against the heated hot-melt adhesive. As a result, the adhesive is adhered to the fabric sheet, and the sheet is flush with the outer surface of the shaft 10.

In manufacturing roller blinds in accordance with this invention, a length of a roller blind shaft 10, with a strip-like mounting element 14A of a hot-melt adhesive 14 that was pre-applied in an undercut groove 12 (as schematically shown in FIG. 2), is cut to a length corresponding to that of a consumer's window. A suitable length of a fabric sheet 16, preferably adjacent to an edge thereof, is then positioned atop the cut length of shaft 10. The fabric sheet is then adhered to the mounting element 14A of the shaft by heating and pressing the fabric sheet over the mounting element (as schematically shown in FIG. 3) to heat and thereby remelt the hot-melt adhesive 14 in the opening 13 of the groove 12. As soon as the hot-melt adhesive 14 has cooled and resolidified, the fabric sheet 16 is securely adhered to the mounting element 14A and securely mounted on the shaft 10.

Thereafter, the fabric sheet 16 can then be removed from the shaft 10 by lifting one longitudinal end of the solidified hot-melt adhesive mounting element 14A that is adhered to the fabric sheet. In this regard, the strip-like mounting element 14A is pulled upwardly, radially away from the shaft 10 and away from the groove 12, and longitudinally of the groove and shaft. Thereby, one can completely separate the cooperating shapes of the mounting element and the groove. The fabric sheet 16 can also be subsequently replaced on the shaft 10. By pushing the mounting element 14A of the fabric sheet downwardly into the groove 12, starting at one longitudinal end of the mounting element and progressively then pushing along its entire length, one can completely reattach the cooperating shapes of the mounting element and the groove. To facilitate removing the mounting element 14A with the fabric sheet 16 from the under-cut groove 12 of the shaft 10, one or both longitudinal ends of the mounting element are preferably provided with a small, preferably integral, pull-tab or the like. Alternatively, longitudinal end portions of the groove 12 could be subsequently cut away to provide access to the longitudinal ends of the mounting element 14A, that had been formed in situ in the groove.

In accordance with this invention, the steps of disconnecting and reconnecting the strip-like mounting element 14A with the fabric sheet 16 from the under-cut groove 12 can be easily done by the consumer for cleaning or changing the fabric sheet on the shaft of the roller blind. In this regard, a replacement fabric sheet 16 can be made, in accordance with this invention, by forming its mounting element 14A in situ on the fabric sheet from a hot-melt adhesive 14 by providing the adhesive in a melted state between a longitudinally-extending undercut groove 12 of an elongate receiving member or mandrel and the fabric sheet, whereby one side of the adhesive adheres to the fabric sheet and an opposite side of the adhesive is removably positioned in the groove of the receiving member.

The method of the invention eliminates the need for realigning the fabric sheet 16 with the shaft 10 when they are reconnected, after having been separated. Also, the elongated strip-like mounting element 14A, provided by this method, replaces doubled-over fabric layers of stitched bead or piping connections for connecting fabric sheets to roller blind shafts.

Figure 5:
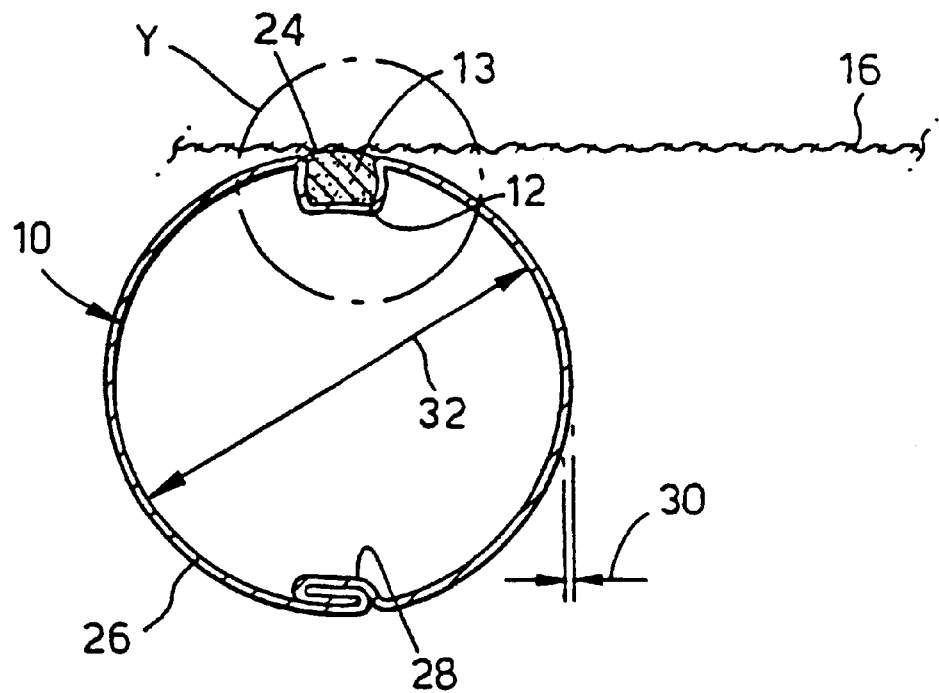
FIG. 5 is a schematic view of the thermoplastic holding the fabric to the undercut groove of the shaft of the roller blind, following the second step of FIG. 3.

FIG. 5 shows an end portion 24 of a fabric sheet 16 connected to an under-cut groove 12 of a roller blind shaft 10. The shaft 10, made by rollforming a sheet metal 26, has a lock seam 28 formed in its side opposite the groove 12. (The thickness of the sheet metal 26 is indicated by reference numeral 30, and the inner diameter of the tubular roller shaft is indicated by reference numeral 32).

FIG. 6 shows an enlargement of the detail "Y" of FIG. 5, but without the hot-melt adhesive, strip-like mounting element 14A and the fabric sheet 16, in order to more clearly show a preferred dove-tail configuration of the undercut groove 12 and preferred relative dimensions thereof. In this regard, the groove 12 is preferably provided with an inner lateral width 34 which exceeds its external lateral width 36 adjacent to the surface of the shaft 10. From the opening 13 of the groove 12 towards its largest inner width 34, there are also preferably two transition wall portions 38 and 40 which terminate in wide angled corners 42 and 44 on laterally opposite side walls of the groove. Furthermore, sharp edges and corners are preferably not present in the groove 12.

In carrying out the method of this invention, any conventional flexible sheet 16 for a roller blind can be used, such as a woven or non-woven fabric, made of natural and/or synthetic fibers, provided the flexible sheet material does not substantially degrade when it is heated to melt the hot-melt adhesive 14 of the strip-like mounting element 14A. For a flexible fabric sheet 16 having interconnected fibers forming interstices therebetween, it is preferred that the hot-melt adhesive 14 of the mounting element 14A, when heated and pressed against the fabric sheet, partly encapsulate its fibers. For certain embodiments of the invention, the flexible fabric sheet 1 6 will preferably be washable.

Likewise, any conventional thermoplastic, preferably a hot-melt adhesive 14 melting above about 100 degrees C., can be used in the mounting element 14A, provided that: i) it can be suitably applied, preferably as a heated liquid, to the opening 13 of the under-cut groove 12 of the shaft 10 to form the mounting element (FIG. 2); and it can subsequently be strongly adhered in a heated state (i.e., partially or totally melted) to the fabric sheet 16. In this regard, it may be preferred for certain embodiments of the invention that the thermoplastic can also be: i) cooled from its liquid state to solidify it as the mounting element 14A, formed in situ in the groove 12, and ii) then reheated, preferably reheated through the fabric sheet 16, to adhere it to the fabric sheet. However, for other embodiments, this may not be necessary if the originally heated, molten thermoplastic, as applied to the opening 13 in the groove 12, can soon or preferably immediately thereafter have the fabric sheet 16 pressed against it so that they adhere strongly to one another. Likewise, the thermoplastic could be reheated just before the fabric sheet 16 is pressed against it to adhere them to each other. Such reheating could also be used to allow a longitudinally-extending thermoplastic bead, placed in the groove 12 in solid form, to conform to the shape of the groove to form the mounting element 14 either before or after adhering it to the fabric sheet 16.

Figure 4:
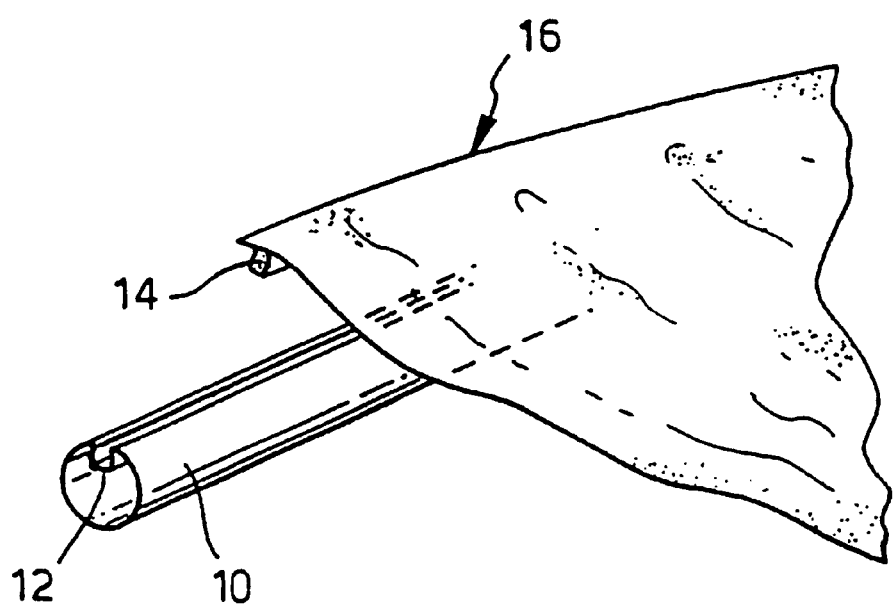
FIG. 4 is a schematic view of a way of removing the fabric with the adhered thermoplastic from the undercut groove of the shaft after the second step of FIG. 3.

Moreover, specific dimensions and configurations of the under-cut groove 12 of the shaft 10 and specific temperatures for heating and cooling and optionally reheating and recooling the thermoplastic, preferably hot-melt adhesive 14, are not considered critical. However, the fabric sheet 16, the thermoplastic, and the dimensions and configurations of the under-cut groove 12 must all be selected, so that after heating the thermoplastic to melt it in the groove and adhere it to the fabric sheet and then cooling the thermoplastic to solidify it, the adhesion between the thermoplastic mounting strip 14A and the fabric sheet is stronger than the adhesion between the mounting strip and the groove when a longitudinal end of the mounting strip is pulled upwardly, radially away from the shaft and away from the groove and longitudinally thereof (FIG. 4). Also, the heating of the thermoplastic is preferably carried out, so that substantially only its surface portions in the opening 13 of the groove 12 are melted, to avoid having molten thermoplastic leak from the groove 12.

The invention is, of course, not limited to the above-described embodiments that can be modified without departing from the scope of the invention or sacrificing all of its advantages. In this regard, the terms in the foregoing description and the following claims, such as "upwardly", "downwardly", "top", "bottom", "radial", "lateral" and "longitudinal", have been used only as relative terms to describe the relationships of the various elements used in carrying out the method of the invention.

I claim:

1. A flexible sheet with an elongated strip-like mounting element that is adhered to one side of the sheet; the mounting element having a lengthwise profile with a cross-section and comprises:
    a first lateral width that is adjacent the sheet;
    a second lateral width that is remote from the sheet and is greater than the first width; and
    two transition portions which extend between the first and second lateral widths, which are on laterally opposite sides of the mounting element, and which terminate in wide angled corners.

2. The sheet of claim 1 wherein the sheet is a fabric.

3. The sheet of claim 2 wherein the mounting element is longitudinally-extending and has a cross-section with a longitudinally-extending undercut.

4. The sheet of claim 1 wherein the mounting element is longitudinally-extending and has a cross-section with a longitudinally-extending undercut.

5. The sheet of claim 4 wherein the mounting element is a thermoplastic element.

6. The sheet of claim 3 wherein the mounting element is a thermoplastic element.

7. The sheet of claim 2 wherein the mounting element is a thermoplastic element.

8. The sheet of claim 1 wherein the mounting element is a thermoplastic element.

9. The sheet of claim 8 wherein the mounting element is a hot-melt adhesive.

10. The sheet of claim 7 wherein the mounting element is a hot-melt adhesive.

11. The sheet of claim 6 wherein the mounting element is a hot-melt adhesive.

12. The sheet of claim 5 wherein the mounting element is a hot-melt adhesive.

13. A method of forming a strip-like mounting element in situ between a longitudinally-elongate receiving member and a side of a flexible sheet, comprising the steps of:
    providing a thermoplastic in a heated state in a longitudinally-extending undercut groove of the receiving member; the groove having no sharp edges or corners and being shaped to form and releasably hold the mounting element; and then
    pressing the side of the sheet against the thermoplastic in a longitudinally-extending opening in the groove; whereby one side of the thermoplastic adheres to the sheet and an opposite side of the thermoplastic is removably positioned in the groove of the receiving member.

14. The method of claim 13 wherein the sheet is a fabric.

15. The method of claim 13 wherein the receiving member is a shaft of a roller blind.

16. The method of claim 13 wherein the thermoplastic is a hot-melt adhesive.

17. The method of claim 16 wherein the receiving member is roll-formed and the thermoplastic is provided in the groove in a heated state immediately after the receiving member is roll-formed.

18. The method of claim 15 wherein the receiving member is roll-formed and the thermoplastic is provided in the groove in a heated state immediately after the receiving member is roll-formed.

19. The method of claim 18 wherein the thermoplastic is then cooled and subsequently reheated just before the sheet is pressed against the thermoplastic.

20. The method of claim 13 wherein the thermoplastic is then cooled and subsequently reheated while the sheet is pressed against the thermoplastic.

21. The method of claim 20 wherein the thermoplastic is reheated by a heating element pressing the sheet against the thermoplastic.

22. The method of claim 19 wherein the thermoplastic is reheated by a heating element pressing the sheet against the thermoplastic.

23. The method of claim 13 wherein the groove is shaped to form a snap-fit connection with the mounting element.

24. The method of claim 23 wherein, from the opening of the groove towards its largest inner width, there are two transition wall portions which terminate in wide angled corners on opposite side walls of the groove.

25. The method of claim 24 wherein the groove and its opening, as well as the thermoplastic therein, extend along substantially the entire longitudinal length of the receiving member.

26. The method of claim 13 wherein the groove and its opening, as well as the thermoplastic therein, extend along substantially the entire longitudinal length of the receiving member.

27. A flexible sheet with a strip-like mounting element adhered to one side of it, made by the method of claim 26.

28. A flexible sheet with a strip-like mounting element adhered to one side of it, made by the method of claim 13.

29. A flexible sheet with a strip-like mounting element adhered to one side of it, made by the method of claim 23.

30. The sheet of any one of claims 1 through 12 further including an elongate shaft or bottom bar with a longitudinally-extending undercut groove and wherein the mounting element is releasably inserted in the groove so as to define a roller blind assembly.

31. A roller blind assembly comprising: an elongate shaft or bottom bar with a longitudinally-extending undercut groove; and a flexible sheet of material with a mounting element formed thereon by providing a thermoplastic in a heated state in said longitudinally-extending undercut groove of the receiving member, with the groove having no sharp edges or corners and being shaped to form and releasably hold the mounting element and then pressing the side of the sheet material against the thermoplastic in a longitudinally-extending opening in the groove whereby one side of the thermoplastic adheres to the sheet and an opposite side of the thermoplastic is removably positioned in the groove of the receiving member.

32. A roller blind assembly comprising: an elongate shaft or bottom bar with a longitudinally-extending undercut groove and a sheet, wherein the sheet is connected to the shaft or bottom bar with a strip-like mounting element formed in the undercut groove, said strip-like mounting element being formed by providing a thermoplastic in a heated state in the undercut groove, the groove having no sharp edges or corners and being shaped to form and releasably hold the mounting element in a snap-fit relationship, and then pressing the side of the sheet against the thermoplastic in the groove, whereby one side of the thermoplastic adheres to the sheet and an opposite side of the thermoplastic is removably positioned in the groove.

33. A roller blind assembly comprising: an elongate shaft or bottom bar with a longitudinally-extending undercut groove and a sheet, wherein the sheet is connected to the shaft or bottom bar with a strip-like mounting element formed in the undercut groove, said strip-like mounting element being formed by providing a thermoplastic in a heated state in the undercut groove, the groove having no sharp edges or corners and being shaped to form and releasably hold the mounting element, and then pressing the side of the sheet against the thermoplastic in the groove, whereby one side of the thermoplastic adheres to the sheet and an opposite side of the thermoplastic is removably positioned in the groove, wherein the groove, as well as the thermoplastic extend along substantially the entire length of the shaft or bottom bar.

34. A method of applying a strip-like mounting element of a thermoplastic to a receiving member, comprising the steps of:

provide a longitudinally-extending undercut groove in the receiving member; the groove being shaped to form the mounting element;

then applying the thermoplastic in a molten state longitudinally of the receiving member in the groove; and then solidifying the thermoplastic into the mounting element.

35. The method of claim 34 wherein the groove has no sharp edges or corners and is shaped to releasably hold the mounting element.

36. The method of claim 35 wherein the thermoplastic is a hot-melt adhesive.

37. A method of applying a flexible sheet to a strip-like mounting element of a thermoplastic, including the steps of:

providing a longitudinally-extending undercut groove in a receiving member; the groove being shaped to form the mounting element;

then applying the thermoplastic in a molten state longitudinally of the receiving member in the groove;

then solidifying the thermoplastic into the mounting element;

then positioning the sheet in contact with the mounting element; and then applying heat to one or both of the sheet and mounting element.

38. The method of claim 37 wherein the groove has no sharp edges or corners and is shaped to releasably hold the mounting element.

39. The method of claim 38 wherein the thermoplastic is a hot-melt adhesive.

40. A method of connecting a flexible sheet to a receiving member, comprising the steps of:

providing a longitudinally-extending undercut groove in a receiving member; the groove being shaped to form a mounting element;

then applying a thermoplastic in a molten state longitudinally of the receiving member in the groove;

then solidifying the thermoplastic into the mounting element;

then positioning the sheet in contact with the mounting element; and then applying heat to one or both of the sheet and mounting element.

41. The method of claim 40 wherein the groove has no sharp edges or corners and is shaped to releasably hold the mounting element.

42. The method of claim 41 wherein the thermoplastic is a hot-melt adhesive.

43. An apparatus for carrying out the method of claims 13 wherein the apparatus comprises at least one pair of opposed forming rolls and a nozzle for applying the thermoplastic in a liquid state.

44. An apparatus for carrying out the method of claim 23 wherein the apparatus comprises at least one pair of opposed forming rolls and a nozzle for applying the thermoplastic in a liquid state.

45. An apparatus for carrying out the method of claim 26 wherein the apparatus comprises at least one pair of opposed forming rolls and a nozzle for applying the thermoplastic in a liquid state.

* * * * *